US012741679B2

(12) United States Patent
Fukumoto

(10) Patent No.: US 12,741,679 B2
(45) Date of Patent: Sep. 22, 2026

(54) VEHICLE BEHAVIOR CONTROL METHOD AND VEHICLE BEHAVIOR CONTROL DEVICE

(71) Applicant: Panasonic Automotive Systems Co., Ltd., Kanagawa (JP)

(72) Inventor: Satoshi Fukumoto, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 31 days.

(21) Appl. No.: 18/929,215

(22) Filed: Oct. 28, 2024

(65) Prior Publication Data

US 2025/0145182 A1 May 8, 2025

(30) Foreign Application Priority Data

Nov. 2, 2023 (JP) ................................ 2023-188392

(51) Int. Cl.

| | |
|---|---|
| ***B60W 60/00*** | (2020.01) |
| ***B60Q 1/54*** | (2006.01) |
| ***B60W 50/00*** | (2006.01) |
| ***B60W 50/14*** | (2020.01) |
| ***H04L 9/40*** | (2022.01) |
| *B60Q 1/50* | (2006.01) |

(52) U.S. Cl.

CPC .... *B60W 60/0057* (2020.02); *B60W 50/0098* (2013.01); *B60W 50/14* (2013.01); *B60W 60/0053* (2020.02); *H04L 63/1441* (2013.01); *B60Q 1/543* (2022.05); *B60W 2050/146* (2013.01); *B60W 2510/20* (2013.01); *B60W 2520/10* (2013.01); *B60W 2554/802* (2020.02)

(58) Field of Classification Search

CPC ......... B60W 60/0057; B60W 50/0098; B60W 50/14; B60W 60/0053; B60W 2050/146; B60W 2510/20; B60W 2520/10; B60W 2554/802; B60W 50/0205; B60W 60/00188; H04L 63/1441; B60Q 1/543

See application file for complete search history.

(56) References Cited

U.S. PATENT DOCUMENTS

| | | | | |
|---|---|---|---|---|
| 2019/0265700 | A1* | 8/2019 | Honda | B60W 50/14 |
| 2021/0026958 | A1* | 1/2021 | Filipek | G06F 21/56 |
| 2021/0086796 | A1* | 3/2021 | Yamasaki | H04W 4/44 |
| 2023/0200670 | A1* | 6/2023 | Kubota | A61B 5/0205<br>600/508 |
| 2024/0059324 | A1* | 2/2024 | Yeom | B60W 30/02 |

FOREIGN PATENT DOCUMENTS

| | | |
|---|---|---|
| JP | 2021111103 A | 8/2021 |

* cited by examiner

*Primary Examiner* — Rodney A Butler

(74) *Attorney, Agent, or Firm* — Seed Intellectual Property Law Group LLP

(57) ABSTRACT

A vehicle behavior control method is disclosed. The method includes detecting, acquiring, determining, and changing. The detecting is to detect a cyber-attack on a vehicle. The acquiring is to acquire situation information including at least one of information about a situation of the vehicle or information about a situation around the vehicle. The determining is to determine, based on the situation information, a safety level related to a countermeasure against the cyber-attack. The changing is to change a vehicle behavior of the vehicle related to the countermeasure against the cyber-attack in accordance with the safety level.

16 Claims, 3 Drawing Sheets

FIG.5

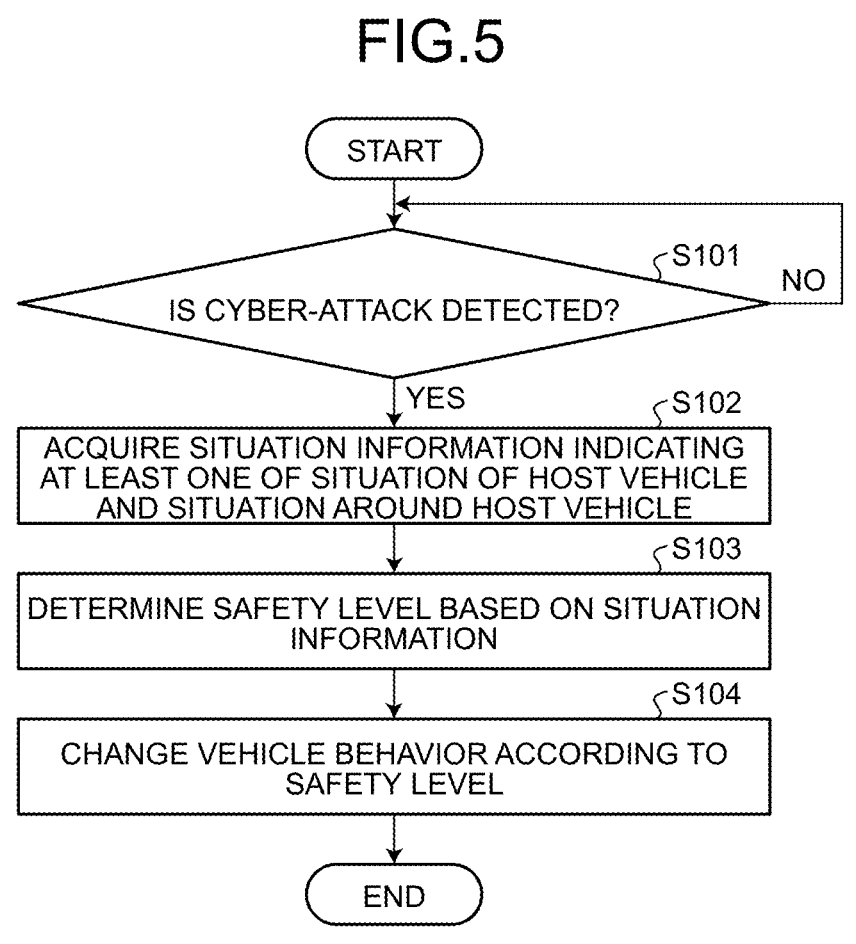

START
S101 IS CYBER-ATTACK DETECTED?
NO
YES
S102 ACQUIRE SITUATION INFORMATION INDICATING AT LEAST ONE OF SITUATION OF HOST VEHICLE AND SITUATION AROUND HOST VEHICLE
S103 DETERMINE SAFETY LEVEL BASED ON SITUATION INFORMATION
S104 CHANGE VEHICLE BEHAVIOR ACCORDING TO SAFETY LEVEL
END

VEHICLE BEHAVIOR CONTROL METHOD AND VEHICLE BEHAVIOR CONTROL DEVICE

CROSS-REFERENCE TO RELATED APPLICATIONS

This application is based upon and claims the benefit of priority from Japanese Patent Application No. 2023-188392, filed on Nov. 2, 2023, the entire contents of which are incorporated herein by reference.

FIELD

Embodiments described herein relate generally to a vehicle behavior control method and a vehicle behavior control device.

BACKGROUND

In existing technology, in a moving body such as a vehicle having an automatic driving function, when the moving body in performing automatic driving is subjected to a cyber-attack such as hacking (unauthorized external operation) by a third party, there is a problem that damage occurs on the moving body subjected to the cyber-attack or a person or another moving body around the moving body subjected to the cyber-attack.

To address such a problem, there is disclosed a technique for diagnosing whether a vehicle has been hacked (for example, a patent literature JP 2021-111103 A).

Under such circumstances, when a moving body is subjected to a cyber-attack, it is preferable to take an action such as interruption of communication with the outside, suspension of automatic driving, and notification to the driver from the viewpoint of safety and security.

However, it is dangerous if automatic driving is suddenly stopped or if notification is provided to the driver on a screen even in manual driving. Therefore, there is a risk that safety is impaired due to an action taken in a case where a cyber-attack is received.

SUMMARY

A vehicle behavior control method according to the present disclosure includes detecting, acquiring, determining, and changing. The detecting is to detect a cyber-attack on a vehicle. The acquiring is to acquire situation information including at least one of information about a situation of the vehicle or information about a situation around the vehicle. The determining is to determine, based on the situation information, a safety level related to a countermeasure against the cyber-attack. The changing is to change a vehicle behavior of the vehicle related to the countermeasure against the cyber-attack in accordance with the safety level.

BRIEF DESCRIPTION OF THE DRAWINGS

FIG. 5 is a flowchart illustrating an example of a procedure of a control process executed by the vehicle behavior control device of FIG. 1.

DETAILED DESCRIPTION

Figure 1:
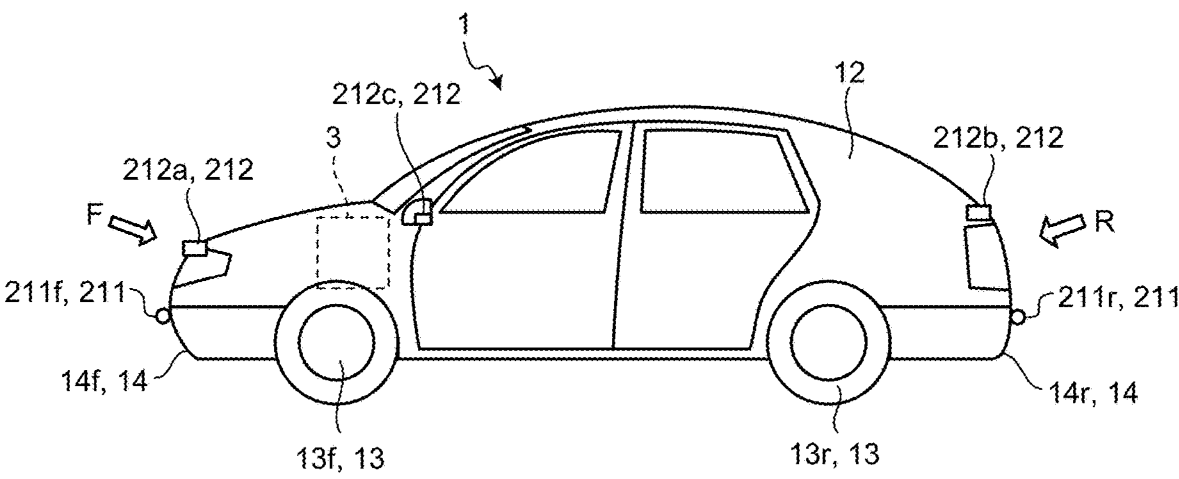
FIG. 1 is a diagram schematically illustrating an example of a vehicle in which a vehicle behavior control device according to an embodiment is provided.

Hereinafter, a vehicle behavior control device (driving assist device), a vehicle, a vehicle behavior control method (driving assist method), a computer program, and a recording medium according to embodiments of the present disclosure will be described with reference to the drawings.

In the description of the present disclosure, components having the same or substantially the same functions as those described above with reference to the previously mentioned drawings are denoted by the same reference numerals, and the description thereof may be omitted as appropriate. Even when the same or substantially the same parts are illustrated, the dimensions and ratios may be differently illustrated between the drawings. From the viewpoint of ensuring the visibility of the drawings, in the description of each drawing, main components are denoted by reference numerals, and even components having the same or substantially the same functions as those described above with reference to the previously mentioned drawings may not be denoted by reference numerals.

In the description of the present disclosure, components having the same or substantially the same function may be described in a distinguished manner by adding alphanumeric characters to the end of the reference numeral. Alternatively, in a case where a plurality of components having the same or substantially the same function are not distinguished from each other, the components may be described in a collective manner by omitting the alphanumeric characters added to the end of the reference numeral.

FIG. 1 is a diagram schematically illustrating an example of a vehicle 1 in which a vehicle behavior control device 3 according to an embodiment is provided. As illustrated in FIG. 1, the vehicle 1 includes a vehicle body 12 and two pairs of wheels 13 disposed along a predetermined direction on the vehicle body 12. The two pairs of wheels 13 include a pair of front tires **13*f* and a pair of rear tires 13*r***.

Here, the vehicle 1 according to the embodiment is an example of a moving body. The front tire **13*f* according to the embodiment is an example of a first wheel. The rear tire 13*r* according to the embodiment is an example of a second wheel. Although FIG. 1 illustrates the vehicle 1 having four wheels 13, the vehicle 1 is not limited thereto. The vehicle 1 may have at least one front tire 13*f* and at least one rear tire 13*r*. The number of wheels 13 of the vehicle 1** may be two, three, or five or more.

A direction of at least one wheel (steering wheel) among the wheels 13 of the vehicle 1 is electrically or mechanically linked to, for example, a rotation angle of a steering wheel disposed in front of a driver's seat **130*a*, namely, a steering angle. Thus, the vehicle 1 can turn right or left by steering. The steering wheel may be the rear tire 13*r* or both the front tire 13*f* and the rear tire 13*r***.

The vehicle body 12 is supported by the wheels 13. The vehicle 1 includes a driving machine (not illustrated), and can be moved by driving at least one wheel (driving wheel) among the wheels 13 of the vehicle 1 using power from the driving machine. As the driving machine, any driving machine such as an engine using gasoline, hydrogen, or the like as a fuel, a motor using electric power from a battery, or a combination of the engine and the motor can be applied. In this case, the predetermined direction in which the two pairs of wheels 13 are arranged is a driving direction of the vehicle 1. The vehicle 1 can move forward or backward by switching a gear (not illustrated) or the like.

The vehicle body 12 has a front end part F that is near an end part on the front tire 13*f*, and a rear end part R that is near an end part on the rear tire 13*r*. The vehicle body 12 has a substantially rectangular shape in top view, and the four corners of the substantially rectangular shape may be referred to as end parts.

A pair of bumpers 14 are provided near a lower end of the vehicle body 12 at the front and rear end parts F and R of the vehicle body 12. A front bumper 14*f* of the pair of bumpers 14 covers an entire front surface and a partial side surface near the lower end part of the vehicle body 12. A rear bumper 14*r* of the pair of bumpers 14 covers an entire rear surface and a partial side surface near the lower end part of the vehicle body 12.

Figure 2:
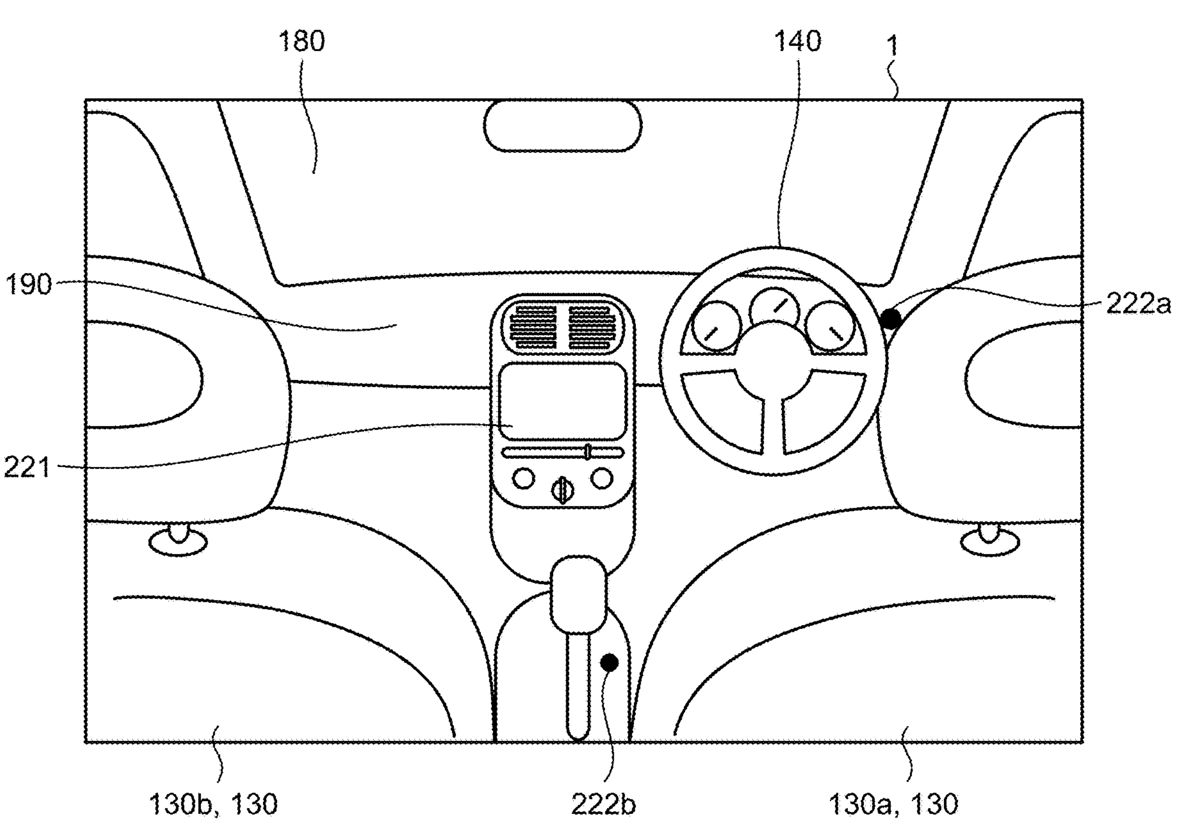
FIG. 2 is a diagram illustrating an example of a configuration near a driver's seat of the vehicle of FIG. 1.

Here, a configuration in the vicinity of the driver's seat of the vehicle 1 according to the present embodiment will be described. FIG. 2 is a diagram illustrating an example of a configuration near a driver's seat of the vehicle 1 of FIG. 1.

As illustrated in FIG. 2, the vehicle 1 includes at least one seat 130. FIG. 2 exemplifies a driver's seat 130*a* and a front passenger's seat 130*b* as seats 130. In addition, a steering wheel 140, a windshield 180, a dashboard 190, a display device 221, and operation buttons 222*a* and 222*b* are provided in front of the driver's seat 130*a*.

The steering wheel 140 is provided in front of the driver's seat 130*a*, and can be operated by a driver. A rotation angle of the steering wheel 140, namely, a steering angle, is electrically or mechanically linked to a change in direction of the front tire 13*f* that is a steering wheel. The steering wheel may be the rear tire 13*r* or both the front tire 13*f* and the rear tire 13*r*.

As illustrated in FIG. 1, the vehicle 1 is equipped with a vehicle behavior control device 3. The vehicle behavior control device 3 is an information processing device that can be provided in the vehicle 1, and is implemented by, for example, an electronic control unit (ECU) or an on board unit (OBU) provided inside the vehicle 1. Note that the vehicle behavior control device 3 may be implemented by a domain control unit (DCU) such as a cockpit domain controller (CDC) in which a plurality of ECUs are integrated. The CDC is configured to be able to execute a control of an in-vehicle infotainment (IVI) or a meter, a control of a display device such as a head up display (HUD) or an electronic mirror, and each process of an advanced driver-assistance system (ADAS) or the like. Alternatively, the vehicle behavior control device 3 may be an external computer installed near the dashboard 190 of the vehicle 1, or may also serve as another device such as a car navigation device. The vehicle behavior control device 3 may be configured integrally with an HMI 22 (see FIG. 3) or configured to be able to operate in conjunction with the HMI 22 by communication to be implemented as an information presentation device that can be provided in the vehicle 1.

Note that the vehicle 1 in which the vehicle behavior control device 3 is provided may be an electric vehicle driven by using power from a storage battery provided therein, or may be a vehicle driven using power from an internal combustion engine. As the vehicle 1 in which the vehicle behavior control device 3 is provided, any of the various types of vehicles (moving bodies) such as a kick scooter, a bicycle, a motorcycle, an automobile with three or more wheels, and a truck can be appropriately used.

Figure 3:
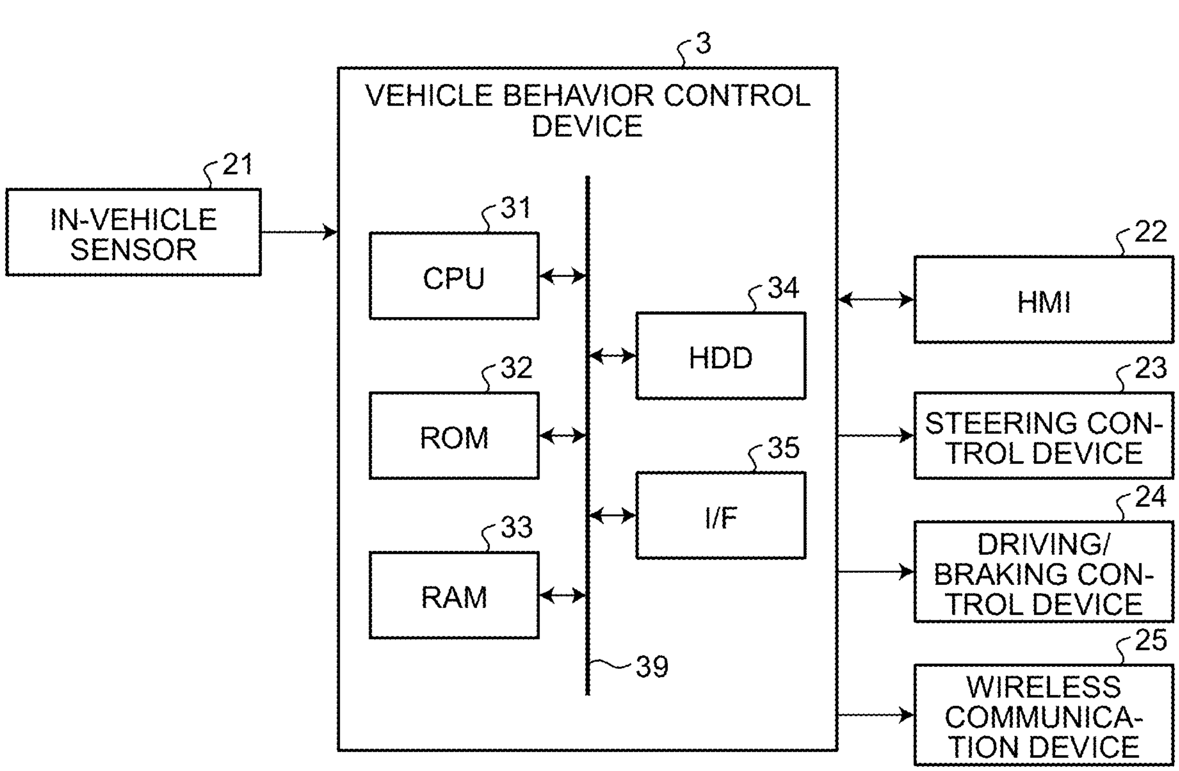
FIG. 3 is a diagram illustrating an example of a hardware configuration of the vehicle behavior control device of FIG. 1.

FIG. 3 is a diagram illustrating an example of a hardware configuration of the vehicle behavior control device 3 of FIG. 1. As illustrated in FIG. 3, the vehicle behavior control device 3 includes a central processing unit (CPU) 31, a read only memory (ROM) 32, a random access memory (RAM) 33, a hard disk drive (HDD) 34, and an interface (I/F) 35. The CPU 31, the ROM 32, the RAM 33, the HDD 34, and the I/F 35 are connected to each other by a bus 39 or the like, and constituting a hardware configuration using a normal computer.

The CPU 31 is an arithmetic device that controls the entire vehicle behavior control device 3. The CPU 31 loads a computer program stored in the ROM 32 or the HDD 34 into the RAM 33 and executes the program, thereby implementing each process to be described below.

The CPU 31 according to the embodiment is an example of at least one processor in the vehicle behavior control device 3. As the at least one processor, another processor may be provided in place of the CPU 31 or in addition to the CPU 31. Note that, as another processor, any of the various types of processors such as a CPU, a graphics processing unit (GPU), and a digital signal processor (DSP), the dedicated arithmetic circuits implemented by an application specific integrated circuit (ASIC) and a field programmable gate array (FPGA), and the like can be used as appropriate.

The ROM 32 stores programs, parameters, and the like for the CPU 31 to implement various types of processes. The ROM 32 according to the embodiment is an example of at least one memory in the vehicle behavior control device 3.

The RAM 33 serves as, for example, a main storage device of the vehicle behavior control device 3, and temporarily stores data used for various processes to be performed by the CPU 31. The RAM 33 according to the embodiment is an example of at least one memory in the vehicle behavior control device 3.

The HDD 34 stores various types of data, programs, and the like used by the vehicle behavior control device 3. In one example, the HDD 34 stores information obtained from various in-vehicle sensors 21 provided in the vehicle 1, such as a sonar 211, an all-around camera 212, an azimuth sensor, and a GNSS sensor. Note that, in place of the HDD 34 or in addition to the HDD 34, any of the various storage media and storage devices such as a solid state drive (SSD) and a flash memory can be used as appropriate. Any of the various storage media and storage devices such as the HDD 34 according to the embodiment is an example of at least one memory in the vehicle behavior control device 3.

The I/F 35 is an interface serving to transmit and receive data. The I/F 35 receives data from another device provided in the vehicle 1, for example, from the in-vehicle sensor 21 or the HMI 22 of the vehicle 1. In addition, the I/F 35 transmits data to another device provided in the vehicle 1, for example, to the HMI 22, a steering control device 23, a driving/braking control device 24, and a wireless communication device 25.

Note that the I/F 35 may transmit and receive information to and from another ECU provided in the vehicle 1 via an in-vehicle network including a controller area network (CAN), Ethernet (registered trademark), a universal serial bus (USB) (registered trademark), or the like in the vehicle 1, or may communicate with an information processing device outside the vehicle 1 via a network such as the Internet. The vehicle behavior control device 3 is connected to each of the in-vehicle sensor 21, the HMI 22, the steering control device 23, the driving/braking control device 24, and the wireless communication device 25 of the vehicle 1 via the in-vehicle network.

The vehicle 1 is equipped with a plurality of in-vehicle sensors 21. FIG. 1 illustrates a sonar 211 and an all-around camera 212 as the in-vehicle sensors 21.

The sonar 211 is provided, for example, at a predetermined end part of the vehicle body 12, to transmit and receive sound waves such as ultrasonic waves. The sonar 211 includes wave transmission/reception units 211*f* and 211*r*. In one example, one or more wave transmission/reception units 211*f* are disposed on the front bumper 14*f*, and one or more wave transmission/reception units 211*r* are disposed on the rear bumper 14*r*. The number of wave transmission/reception units 211*f* and 211*r* and/or positions of the wave transmission/reception units 211*f* and 211*r* are not limited to the example illustrated in FIG. 1, and can be changed as appropriate. In one example, the vehicle 1 may include wave transmission/reception units 211*f* and 211*r* on the left and right sides thereof.

The sonar 211 detects an obstacle around the vehicle 1 based on a sound wave transmission/reception result. In addition, the sonar 211 measures a distance between the obstacle around the vehicle 1 and the vehicle 1, based on the sound wave transmission/reception result. The obstacle is, for example, an object around the vehicle 1. The obstacle may include a person, various kinds of moving bodies such as a vehicle, and a structure.

In the present embodiment, the sonar 211 using sound waves such as ultrasonic waves is exemplified, but the present disclosure is not limited thereto. The vehicle 1 may be provided with, for example, a radar that transmits and receives electromagnetic waves in place of the sonar 211 or in addition to the sonar 211.

The all-around camera 212 is provided on the vehicle 1 so as to capture images of the surroundings of the vehicle 1. In one example, the vehicle 1 includes, as the all-around camera 212, a front camera 212*a* that captures images on the front region, a rear camera 212*b* that captures images on the rear region, a left side camera 212*c* that captures images on the left side, and a right side camera (not illustrated) that captures images on the right side.

The all-around camera 212 captures images of the surroundings of the vehicle 1. The all-around camera 212 is a camera that captures images based on, for example, visible light and/or infrared light. Note that the images captured by the all-around camera 212 may be moving images or still images.

Note that the positions of the all-around cameras 212 and/or the number of all-around cameras 212 is not limited to the example illustrated in FIG. 1, and can be changed as appropriate. In one example, the vehicle 1 may include two cameras, the front camera 212*a* and the rear camera 212*b*. Alternatively, the vehicle 1 may further include another camera in addition to the cameras in the above-described example. Some of or all the all-around cameras 212 may be provided in a vehicle interior space of the vehicle 1 (inside the vehicle). The all-around camera 212 may be a camera embedded in the vehicle 1, a camera of a drive recorder retrofitted on the vehicle 1, or the like.

In addition, the in-vehicle sensor 21 includes various sensors that are not illustrated. In one example, the in-vehicle sensor 21 includes a steering angle sensor that outputs a signal corresponding to an operation amount of a steering wheel by a driver, namely, a steering angle. In one example, the in-vehicle sensor 21 includes a wheel speed sensor that outputs a signal corresponding to a rotation speed and a rotation direction of the wheels 13. In one example, the in-vehicle sensor 21 includes a brake sensor that detects an operation amount of a brake pedal by a driver. In one example, the in-vehicle sensor 21 includes an accelerator sensor that detects an operation amount of an accelerator pedal by a driver. In one example, the in-vehicle sensor 21 includes an acceleration sensor that outputs a signal corresponding to an acceleration applied to the vehicle 1. In one example, the in-vehicle sensor 21 includes a gyro sensor that outputs a signal corresponding to an angular velocity applied to the vehicle 1. Each of the acceleration sensor and the gyro sensor may be provided in three axes, and configured as an inertial measurement unit (IMU). In one example, the in-vehicle sensor 21 includes an azimuth sensor that detects an azimuth in a driving direction of the vehicle 1 from a rotation difference between the left and right wheels 13 of the vehicle 1, geomagnetism, a gas rate gyro, an optical fiber gyro, or the like. In one example, the in-vehicle sensor 21 includes a global navigation satellite system (GNSS) sensor that outputs information on a position of the vehicle 1, such as a global positioning system (GPS) sensor. Note that the GNSS sensor includes a GNSS antenna that receives radio waves from satellites, and a GNSS circuit that obtains position information based on radio waves from at least two satellites received by the GNSS antenna.

The HMI 22 is an interface serving to output various types of information such as notification and a warning to a driver of the vehicle 1. In addition, the HMI 22 is also an interface serving to receive inputs of vehicle operations and various types of information made by a driver of the vehicle 1. The HMI 22 is sufficient to output notification or a warning so as to enable the driver of the vehicle 1 to recognize, and sufficient to receive various operations performed the driver of the vehicle 1. The HMI is provided, for example, around the driver's seat 130*a* of the vehicle 1, but may be provided in another part around the driver's seat 130*a* such as a rear seat.

The HMI 22 includes a display device that outputs various types of information such as notification and a warning to the driver of the vehicle 1. In one example, the HMI 22 includes a display device 221 configured to output an image. The display device 221 may be provided in the dashboard 190 or a console of the vehicle 1. FIG. 2 illustrates a display device 221 disposed at the center of the dashboard 190. The display device 221 is, for example, a liquid crystal display (LCD) or an organic electro luminescence (EL) display. Here, the HMI 22 serving as a display device according to the embodiment is an example of a display unit. The HMI 22 serving as a display unit displays various screens based on various types of display information from the vehicle behavior control device 3.

Note that the display device 221 may be configured as a touch panel display. In addition, the display device 221 may be a part of a car navigation device provided in the vehicle 1. The display may be a projection-type display device such as a head up display (HUD) that projects an image (virtual image) on a display area or the like in front of the driver on the windshield 180 or the dashboard (console) 190.

Note that the HMI 22 is not limited to the display device, and may include another output device such as a speaker configured to be able to output a notification sound, a warning sound, or a sound. Here, the HMI 22 serving as an output device according to the embodiment is an example of a notification unit.

In addition, the HMI 22 includes an input device that receives inputs of vehicle operations and various types of information made by the driver of the vehicle 1. In one example, the HMI 22 includes a touch panel of the display device 221 configured as a touch panel display as the input device. In one example, the HMI 22 includes operation buttons 222*a* and 222*b* as the input device. FIG. 2 illustrates an operation button 222*a* disposed on an instrument panel and an operation button 222*b* provided on a console. The operation buttons 222*a* and 222*b* may be provided at other positions such as the steering wheel 140 and the dashboard 190. In addition, if there is another input device such as a case where a touch panel of the display device 221 can be used as an input device of the HMI 22, the operation buttons 222*a* and 222*b* may not be provided. Here, the HMI 22 serving as an input device according to the embodiment is an example of an operation unit. The HMI 22 serving as an operation unit outputs, to the vehicle behavior control device 3, signals corresponding to various operations on the touch panel of the display device 221 and the operation buttons 222*a* and 222*b* from the user.

Note that the HMI 22 may include other input devices such as other buttons, dials, switches, and microphones. These input devices are disposed on, for example, the dashboard 190, the instrument panel, the steering wheel 140, the console, or the like of the vehicle 1.

As an output device, an input device, or an input/output device of the HMI 22, an operation terminal capable of receiving, transmitting, or transmitting and receiving signals between the vehicle 1 and the outside of the vehicle 1, such as a tablet terminal, a smartphone, a remote controller, or an electronic key, may be used.

The steering control device 23 controls the steering of the vehicle 1. The steering control device 23 directs the wheels 13 to a direction corresponding to, for example, a control signal corresponding to an operation amount of the steering wheel 140 by the driver or a control signal from the vehicle behavior control device 3. The steering control device 23 may include a steering actuator (not illustrated) that changes a rotation angle of the steering wheel 140 in accordance with the control signal from the vehicle behavior control device 3.

The driving/braking control device 24 controls the acceleration/deceleration of the vehicle 1. The driving/braking control device 24 includes, for example, a brake actuator (not illustrated) and an engine controller (not illustrated). The brake actuator applies braking to the vehicle 1 or decelerates the vehicle 1 by operating a brake, changing a shift (gear ratio), or controlling an output of a driving machine such as an engine or a motor based on a detection result of a brake sensor (not illustrated) that detects an operation amount of a brake pedal by a driver or a control signal from the vehicle behavior control device 3. The accelerator controller accelerates the vehicle 1 by controlling an output of a driving machine such as an engine or a motor based on a detection result of an accelerator sensor (not illustrated) that detects an operation amount of an accelerator pedal by a driver or a control signal from the vehicle behavior control device 3.

The wireless communication device 25 transmits and receives radio signals by which information is transmitted between the vehicle 1 and the outside (for example, a radio base station). The wireless communication device 25 includes an antenna (not illustrated), and is configured to be able to transmit and receive radio signals between the vehicle 1 and the outside via the antenna. The transmission and reception of radio signals are performed by any cellular V2X system such as a mobile communication system of each generation such as 3G, LTE, 4G, or 5G compliant with regulations of IMT2020 or specifications of 3GPP (registered trademark), or a mobile communication system of a next generation such as Beyond 5G (6G). Note that the communication system may be another communication system such as, for example, a DSRC system compliant with the IEEE standard or a vehicle-to-vehicle or road-to-vehicle communication (vehicle-to-cellular-network (V2N)) system.

Although FIG. 3 illustrates a case where the in-vehicle sensor 21, the HMI 22, the steering control device 23, the driving/braking control device 24, and the wireless communication device 25 are not included in the vehicle behavior control device 3, the present disclosure is not limited thereto. Some of or all them may be included in the vehicle behavior control device 3.

Figure 4:
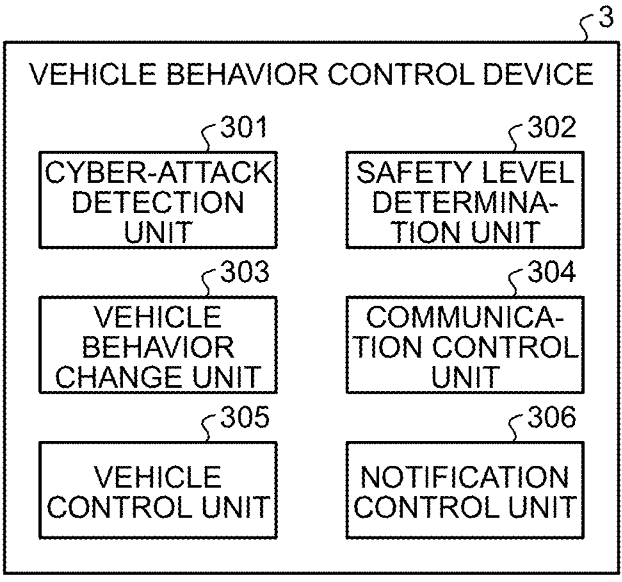
FIG. 4 is a diagram illustrating an example of a functional configuration of the vehicle behavior control device of FIG. 1.

FIG. 4 is a diagram illustrating an example of a functional configuration of the vehicle behavior control device 3 of FIG. 1. The vehicle behavior control device 3 implements the functions of a cyber-attack detection unit 301, a safety level determination unit 302, a vehicle behavior change unit 303, a communication control unit 304, a vehicle control unit 305, and a notification control unit 306, as the CPU 31 executes the program loaded in the RAM 33.

The cyber-attack detection unit 301 detects a cyber-attack on the vehicle 1. As a method of detecting a cyber-attack, a known detection method can be appropriately used.

In one example, the cyber-attack detection unit 301 may detect a cyber-attack on the vehicle 1 based on a processing time when the vehicle 1 is caused to execute a process determined in advance. When the vehicle 1 is subjected to a cyber-attack such as hacking from the outside, a change may occur in the vehicle 1 such that processing speed of software by the vehicle becomes extremely slow. Therefore, the cyber-attack detection unit 301 may detect, as a cyber-attack, a case where the predetermined standard is not satisfied, such as a case where processing time of a predetermined process takes long, a case where the predetermined processing cannot be executed, or a case where the accuracy of the predetermined processing deteriorates. A cyber-attack may be detected outside the vehicle 1. In such a case, the cyber-attack detection unit 301 may detect the cyber-attack on the host vehicle based on notification about a detection result from the outside.

The safety level determination unit 302 acquires situation information about the vehicle 1, and determines a safety level related to a countermeasure against the cyber-attack based on the acquired situation information.

The situation information includes information about a situation of the host vehicle (the vehicle 1) and/or information about a situation around the host vehicle.

The safety level related to the countermeasure against the cyber-attack refers to information representing a state of at least one item of the situation information, for example, a state where no obstacle is detected around the vehicle but the vehicle is driving on a highway. Note that the safety level may be an index value defined (calculated) by each item of the situation information. The index value may be set to a maximum value or a minimum value when the vehicle is stopped and no obstacle is detected around the vehicle. The safety level may be an index value defined (calculated) by each item of the situation information defined for each state of a specific item of the situation information. Thus, the safety level may be defined by a plurality of index values.

The information about the situation of the host vehicle includes at least one of a vehicle speed, a steering angle, a driving mode, or a security severity level of the vehicle 1. The driving mode indicates a driving mode that is being executed by the vehicle 1 in automatic driving or manual driving. The security severity level refers to, for example, an index indicating a risk of the detected cyber-attack in a stepwise manner. Note that the security severity level may be information representing the type of the detected cyber-attack or the risk thereof, or may be information representing the possibility of secondary damage or the influence range of the detected cyber-attack.

The information about the situation around the vehicle 1 includes information about a driving place of the vehicle 1 and/or obstacle information representing the presence or absence of an obstacle around the vehicle 1 and a position of this obstacle. The information about the driving place includes information representing a category of the driving place of the vehicle 1 such as an expressway, a general road, an intersection, a highway, or a community road. Note that the information about the driving place may include information representing the number of travel lanes, a position and width of a lane on which the vehicle 1 is driving, a speed limit, an applicable traffic regulation, and the like. The state that the vehicle 1 is driving includes a case where the vehicle 1 is temporarily stopped, such as a case where the vehicle 1 is in a traffic jam or waiting for a traffic light.

The safety level determination unit 302 acquires situation information about the vehicle 1 based on information from another ECU or the in-vehicle sensor 21 via the I/F 35. The safety level determination unit 302 also acquires information from another ECU or the in-vehicle sensor 21 as situation information about the vehicle 1.

In one example, the safety level determination unit 302 may acquire information about the vehicle 1, such as a steering (steering angle), a vehicle speed, a vehicle speed pulse, a tire pulse, an angular velocity including a yaw rate, an acceleration, a position, a shift, and a vehicle log.

In one example, the safety level determination unit 302 may acquire information about a situation around the vehicle 1, such as a detection result of an obstacle around the vehicle 1 and a surrounding image.

In one example, the safety level determination unit 302 may acquire, from the cyber-attack detection unit 301, information indicating that a cyber-attack has been detected or information indicating the presence or absence of a cyber-attack, an index indicating a risk of the detected cyber-attack in a stepwise manner, the type and detail of the detected cyber-attack, the possibility of secondary damage, and information indicating an influence range.

In one example, the safety level determination unit 302 may acquire information such as a position, a vehicle speed, a driving place, an obstacle position, and a driving path from a car navigation device (for example, another ECU) provided in the vehicle 1.

In one example, the safety level determination unit 302 may acquire a position of the vehicle 1 by using a dead-reckoning (DR) technique based on an amount of movement of the vehicle 1 from the reference position or by using a known map matching or GNSS sensor. Moreover, the safety level determination unit 302 may acquire a position of the vehicle 1 by combining a SLAM technique with the dead reckoning technique.

In one example, the safety level determination unit 302 may acquire a position, a vehicle speed, a moving direction, and the like of the vehicle 1 and/or another vehicle using intelligent transport systems (ITS).

In one example, the safety level determination unit 302 may acquire a position, a vehicle speed, a moving direction, and the like of another vehicle using inter-vehicle communication.

The vehicle behavior change unit 303 changes the vehicle behavior of the vehicle 1 related to the countermeasure against the cyber-attack in accordance with the safety level determined by the safety level determination unit 302. Specifically, the vehicle behavior change unit 303 changes the vehicle behavior of the vehicle 1 in accordance with at least one of the vehicle speed, the steering angle, the driving mode, or the security severity level of the vehicle 1, the information about the driving place of the vehicle 1, and the obstacle information.

The change of the vehicle behavior according to the safety level is limiting or changing the vehicle behavior of the vehicle 1 according to the safety level as a countermeasure against the detected cyber-attack. It is assumed that the correspondence between the safety level and the detail of the change of the vehicle behavior is determined in advance and stored in the memory of the vehicle behavior control device 3.

In one example, when a cyber-attack on the vehicle 1 is detected by the cyber-attack detection unit 301, the vehicle behavior change unit 303 changes the mode of communication performed by the communication control unit 304 in accordance with the safety level determined by the safety level determination unit 302. The change of the communication mode may be interruption of communication, restriction of a communication band, change of a communication method, restriction of a vehicle function of permitting communication, or the like.

In one example, when a cyber-attack on the vehicle 1 is detected by the cyber-attack detection unit 301, the vehicle behavior change unit 303 changes the mode of vehicle control performed by the vehicle control unit 305 in accordance with the safety level determined by the safety level determination unit 302.

In one example, the vehicle behavior change unit 303 may change the control timing of performing handover from automatic driving to manual driving in accordance with the safety level when automatic driving is being performed (during automatic driving).

In one example, the vehicle behavior change unit 303 may change, in accordance with the safety level in performing automatic driving, between a mode that the handover from automatic driving to manual driving is performed at the time when a cyber-attack on the vehicle 1 is detected, and a mode that the handover from automatic driving to stoppage or manual driving is performed after continuing the automatic driving until a safe condition is satisfied, for example, until the vehicle 1 is stopped on a road shoulder.

In a case where the vehicle speed is lower than a speed determined in advance and stored in the memory, such as a case where the vehicle 1 is stopped or driving at a low speed due to traffic congestion or the like during automatic driving, the vehicle behavior change unit 303 may take the mode of performing the handover to manual driving at the time when a cyber-attack on the vehicle 1 is detected.

In a case where the vehicle speed is higher than a speed determined in advance and stored in the memory during the automatic driving, the vehicle behavior change unit 303 may keep the automatic driving state until the vehicle speed decreases to a speed equal to or lower than the predetermined speed from the time when a cyber-attack on the vehicle 1 is detected, and perform the handover to manual driving after the vehicle speed decreases to the predetermined speed or lower.

In a case where an obstacle such as another vehicle is detected ahead during automatic driving and automatic braking is being performed, the vehicle behavior change unit 303 may keep the automatic driving state until the vehicle speed decreases to a speed equal to or lower than a speed determined in advance and stored in the memory or until the automatic braking is released from the time when a cyber-attack on the vehicle 1 is detected, and hand over to manual driving after the vehicle speed decreases to the predetermined speed or lower or the automatic braking is released.

In a case where the steering angle is larger than a predetermined angle determined in advance and stored in the memory during automatic driving, the vehicle behavior change unit 303 may keep the automatic driving state until the steering angle decreases to a steering angle equal to or smaller than the predetermined angle from the time when a cyber-attack on the vehicle 1 is detected, and hand over to the manual driving after the steering angle decreases to the predetermined angle or smaller.

In a case where the vehicle 1 is passing through an intersection during automatic driving, the vehicle behavior change unit 303 may keep the automatic driving state until the vehicle 1 finishes passing through the intersection from the time when a cyber-attack on the vehicle 1 is detected, and may hand over to manual driving after the vehicle 1 finishes passing through the intersection. Note that the vehicle control according to another type of safety level such as a vehicle speed or a steering angle may be continued after the vehicle 1 finishes passing through the intersection.

In one example, when remote parking is being performed (during remote parking) and the vehicle 1 is located at a position where the driver cannot get on the vehicle 1, which can be determined based on a distance from an obstacle detected around the vehicle 1, a width of a driving path, or the like, the vehicle behavior change unit 303 may interrupt automatic driving for remote parking after the vehicle 1 is moved to a position where the driver can get on the vehicle 1 from the time when a cyber-attack on the vehicle 1 is detected. The remote parking refers to a parking mode that driving of the vehicle 1 is controlled by a driver's operation using the HMI 22 from the outside of the vehicle 1 or by automatic driving in response to an instruction from the driver using the HMI 22.

In one example, when a cyber-attack on the vehicle 1 is detected by the cyber-attack detection unit 301, the vehicle behavior change unit 303 may notify a person or a vehicle around the vehicle 1 by using a hazard lamp (notification unit) or the like of the vehicle 1. This notification can be utilized for notifying the outside of the vehicle 1 that the driving mode of the vehicle 1 is changed, such as a change in vehicle control mode of the vehicle 1. The notification to the surroundings using the hazard lamp may be performed by simply operating the hazard lamp or by changing an operation mode of the hazard lamp from normal blinking to different indication. In addition, for the operation mode of the hazard lamp, multiple patterns of blinking that correspond to safety levels or changes in driving mode of the vehicle 1 may be prepared.

In one example, when a cyber-attack on the vehicle 1 is detected by the cyber-attack detection unit 301, the vehicle behavior change unit 303 changes the mode of notification performed by the notification control unit 306 in accordance with the safety level determined by the safety level determination unit 302.

In one example, when a cyber-attack on the vehicle 1 is detected by the cyber-attack detection unit 301, the vehicle behavior change unit 303 may notify the user such as the driver that the cyber-attack has been detected or of the details thereof through the HMI 22.

In one example, when a cyber-attack on the vehicle 1 is detected by the cyber-attack detection unit 301, the vehicle behavior change unit 303 may guide a passenger to take a safe posture through the HMI 22. The safe posture is a safe posture with respect to a change in driving mode of the vehicle 1, and is a posture for preparing for an impact or the like that may occur due to the change in driving mode of the vehicle 1 such as sudden braking, a sudden change in driving direction, or contact with the surroundings, or a posture for minimizing injury caused by the impact. The passenger may be guided on the safe posture by either outputting a sound or displaying a screen. This guidance may be, for example, guidance on postures to be taken such as "tilt forward, tuck the chin, and put the head on the front seat" together with "place both hands behind the head" or "put the arms down sideways and put the arms on the feet", or guidance on postures to be avoided. In addition, as the guidance on the safe posture, a plurality of guidance details corresponding to the safety levels and the details of changes in the driving mode of the vehicle 1 may be prepared.

In one example, when the communication mode or the vehicle control mode is changed in accordance with the safety level, the vehicle behavior change unit 303 may notify the user such as the driver that the communication mode or the vehicle control mode is changed or of the details of the change through the HMI 22.

In one example, when the vehicle 1 is handed over from automatic driving to manual driving by the vehicle control according to the safety level, the vehicle behavior change unit 303 may provide notification including a guidance display such as a manual driving route and a stop position after the handover to the user such as the driver through the HMI 22.

In one example, when manual driving is being performed (during manual driving), the vehicle behavior change unit 303 may change the notification timing of making notification about a cyber-attack to the driver of the vehicle 1 in accordance with the safety level.

In one example, the vehicle behavior change unit 303 may change, in accordance with the safety level in performing manual driving, between a mode of providing notification at the time when a cyber-attack on the vehicle 1 is detected, and a mode of providing notification after the vehicle 1 is manually driven to a safe state, such as a state where the vehicle 1 is stopped on a road shoulder or the vehicle speed is reduced.

In one example, in a case where the vehicle speed is higher than a predetermined speed determined in advance and stored in the memory during the manual driving, the vehicle behavior change unit 303 may suspend notification until the vehicle speed decreases to a speed equal to or lower than the predetermined speed from the time when a cyber-attack on the vehicle 1 is detected, and notify the driver or the like after the vehicle speed decreases to the predetermined speed or lower.

In one example, when the vehicle speed is lower than a speed determined in advance and stored in the memory during manual driving or when the vehicle 1 is stopped, the vehicle behavior change unit 303 may perform notification to the driver or the like at the time when a cyber-attack on the vehicle 1 is detected.

In one example, the vehicle behavior change unit 303 may change, in accordance with the safety level during manual driving, between a sound and a screen, namely, output of sound or display of screen, for performing notification about a cyber-attack. This is to suppress a decrease in safety caused by the driver seeing notification when the notification is made by display a screen.

In one example, in a case where the vehicle speed is higher than a speed determined in advance and stored in the memory during manual driving, the vehicle behavior change unit 303 may first perform notification by outputting a sound through the HMI 22, and may perform notification by displaying a screen through the HMI 22 after the vehicle speed decreases to the predetermined speed or lower.

The communication control unit 304 controls wireless communication performed by the wireless communication device 25 with the outside of the vehicle 1.

The vehicle control unit 305 controls at least one of steering, braking, or acceleration/deceleration of the vehicle 1.

The notification control unit 306 controls display and sound output through the HMI 22.

Next, a procedure of a control process executed by the vehicle behavior control device 3 configured as described above will be described. FIG. 5 is a flowchart illustrating an example of a procedure of a control process executed by the vehicle behavior control device 3 of FIG. 1.

The vehicle behavior control device 3 determines whether a cyber-attack on the vehicle 1 is detected (S101).

When no cyber-attack is detected (S101: No), the procedure of FIG. 5 returns to the process of S101. The vehicle behavior control device 3 may repeatedly execute a process (S101) related to a detection of a cyber-attack at predetermined intervals determined in advance.

When a cyber-attack is detected (S101: Yes), the vehicle behavior control device 3 acquires situation information that represents a situation of the host vehicle and/or a situation around the host vehicle (S102). In addition, the vehicle behavior control device 3 determines a safety level based on the acquired situation information (S103). Then, the vehicle behavior control device 3 changes a vehicle behavior of the vehicle 1 in accordance with the determined safety level (S104). Thereafter, the procedure of FIG. 5 ends.

As described above, the vehicle behavior control device 3 according to the embodiment is configured to change the mode of notification to the driver and control on the vehicle 1 in accordance with the situation of the vehicle 1 or the situation around the vehicle 1. In general, it is dangerous when automatic driving is suddenly stopped or when notification is provided to the driver on a screen even in manual driving. In such a case, there is a risk that safety is impaired due to an action taken by the driver when a cyber-attack is received. Under such circumstances, the embodiment having the above-described configuration makes it possible to provide notification and control the vehicle 1 in accordance with the safety level based on the situation of the vehicle 1 during driving such as automatic driving, thereby notifying the driver and stopping the vehicle 1 in a safe manner. Therefore, the above-described configuration makes it possible to improve safety in a case where a cyber-attack is received.

Note that, in the above-described embodiments, "determining whether it is A" may mean determining that it is A, determining that it is not A, or determining whether it is A or not.

A computer program executed by the vehicle behavior control device 3 according to the above-described embodiment may be recorded in a computer-readable storage medium, such as a CD-ROM, an FD, a CD-R, a DVD, or an SD card, as a file in an installable format or an executable format for provision.

In addition, the program executed by the vehicle behavior control device 3 according to the above-described embodiment may be stored on a computer connected to a network such as the Internet and downloaded via the network for provision. In addition, the program executed by the vehicle behavior control device 3 may be provided or distributed via the network such as the Internet.

In addition, the program executed by the vehicle behavior control device 3 according to the above-described embodiment may be installed in the ROM or the like in advance for provision.

In addition, the program executed by the vehicle behavior control device 3 according to the above-described embodiment has a module configuration including the above-described functional units (the cyber-attack detection unit 301, the safety level determination unit 302, the vehicle behavior change unit 303, the communication control unit 304, the vehicle control unit 305, and the notification control unit 306), and as actual hardware, the CPU 31 reads the program from the ROM 32 or the HDD 34 and executes the program, so that each of the functional units is loaded onto the RAM 33, and each of the functional units is generated on the RAM 33.

According to at least one of the embodiments described above, it is possible to improve safety in a case where a cyber-attack is received.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

SUPPLEMENTARY NOTE

The following technology is disclosed by the above description of the embodiments.

(1)

A vehicle behavior control method comprising:

detecting a cyber-attack on a vehicle;

acquiring situation information including at least one of information about a situation of the vehicle or information about a situation around the vehicle;

determining, based on the situation information, a safety level related to a countermeasure against the cyber-attack; and changing a vehicle behavior of the vehicle related to the countermeasure against the cyber-attack in accordance with the safety level.

(2)

The vehicle behavior control method according to (1), wherein the information about the situation of the vehicle includes at least one of a vehicle speed, a steering angle, a driving mode, or a security severity level of the vehicle.

(3)

The vehicle behavior control method according to (1) or (2), wherein the information about the situation around the vehicle includes at least one of information about a driving place of the vehicle or information about obstacle around the vehicle, the information about obstacle indicating at least one of presence or absence of the obstacle around the vehicle or a position of the obstacle.

(4)

The vehicle behavior control method according to any one of (1) to (3), wherein the changing of the vehicle behavior includes changing, when automatic driving is being performed, a control timing of handover from the automatic driving to manual driving in accordance with the safety level.

(5)

The vehicle behavior control method according to any one of (1) to (4), wherein the changing of the vehicle behavior includes interrupting automatic driving for remote parking, the interrupting being performed after moving the vehicle to a position where a driver of the vehicle is allowed to get on the vehicle from a time point at which the cyber-attack is detected, the moving of the vehicle being performed based on a distance to an obstacle detected around the vehicle when the remote parking is being performed.

(6)

The vehicle behavior control method according to any one of (1) to (5), wherein the changing of the vehicle behavior includes changing, when manual driving is being performed, a notification timing of making notification about the cyber-attack to a driver of the vehicle in accordance with the safety level.

(7)

The vehicle behavior control method according to any one of (1) to (6), wherein the changing of the vehicle behavior includes changing between sound output and screen display for notification about the cyber-attack to a driver of the vehicle when manual driving is being performed.

(8)

The vehicle behavior control method according to any one of (1) to (7), wherein the changing of the vehicle behavior includes notifying surroundings of a change in driving mode of the vehicle by operating a hazard lamp of the vehicle.

(9)

The vehicle behavior control method according to any one of (1) to (8), wherein the changing of the vehicle behavior includes guiding a passenger of the vehicle on a safe posture with respect to a change in driving mode of the vehicle.

(10)

A vehicle behavior control device comprising:

a processor; and a memory having instructions that, when executed by the processor, cause the processor to perform operations comprising:

detecting a cyber-attack on a vehicle;

acquiring situation information including at least one of information about a situation of the vehicle or information about a situation around the vehicle;

determining, based on the situation information, a safety level related to a countermeasure against the cyber-attack; and changing a vehicle behavior of the vehicle related to the countermeasure against the cyber-attack in accordance with the safety level.

(11)

A vehicle behavior control device comprising:

at least one processor; and a memory in which at least one program executed by the at least one processor is stored, wherein the at least one processor is configured to implement the vehicle behavior control method according to any one of (1) to (9) by executing the at least one program.

(12)

A computer program for causing a computer to execute the vehicle behavior control method according to any one of (1) to (9).

(13)

A computer program product in which the computer program according to (12) is recorded as a program to be executed by a computer.

(14)

A vehicle comprising:

the vehicle behavior control device according to (10) or (11); and a notification unit configured to provide notification to a driver of the vehicle, a passenger of the vehicle, or surroundings of the vehicle.

(15)

A vehicle comprising:

the vehicle behavior control device according to (10) or (11); and a control device configured to control at least one of a steering angle, driving, or braking, in accordance with a control signal from the control unit.

(16)

A vehicle comprising:

the vehicle behavior control device according to (10) or (11); and at least one of a sonar, an all-around camera, a steering angle sensor, a wheel speed sensor, an azimuth sensor, or a GNSS sensor.

What is claimed is:

1. A vehicle behavior control device comprising:

a processor; and a memory having instructions that, when executed by the processor, cause the processor to perform operations comprising:

detecting a cyber-attack on a vehicle;

acquiring situation information including at least one of information about a situation of the vehicle or information about a situation around the vehicle;

determining, based on the situation information, a safety level related to a countermeasure against the cyber-attack; and changing a vehicle behavior of the vehicle related to the countermeasure against the cyber-attack in accordance with the safety level wherein the changing of the vehicle behavior includes interrupting automatic driving during remote parking, the interrupting being performed after moving the vehicle to a position where a driver of the vehicle is allowed to get on the vehicle from a time point at which the cyber-attack is detected, the moving of the vehicle being performed based on a distance to an obstacle detected around the vehicle during the remote parking.

2. The vehicle behavior control device according to claim 1, wherein the information about the situation of the vehicle includes at least one of a vehicle speed, a steering angle, a driving mode, or a security severity level of the vehicle.

3. The vehicle behavior control device according to claim 1, wherein the information about the situation around the vehicle includes at least one of information about a driving place of the vehicle or information about obstacle around the vehicle, the information about obstacle indicating at least one of presence or absence of the obstacle around the vehicle or a position of the obstacle.

4. The vehicle behavior control device according to claim 1, wherein the changing of the vehicle behavior includes changing, when automatic driving is being performed, a control timing of handover from the automatic driving to manual driving in accordance with the safety level.

5. The vehicle behavior control device according to claim 1, wherein the changing of the vehicle behavior includes changing, when manual driving is being performed, a notification timing of making notification about the cyber-attack to a driver a driver of the vehicle in accordance with the safety level.

6. The vehicle behavior control device according to claim 1, wherein the changing of the vehicle behavior includes changing between sound output and screen display for notification about the cyber-attack to a driver of the vehicle when manual driving is being performed.

7. The vehicle behavior control device according to claim 1, wherein the changing of the vehicle behavior includes notifying surroundings of a change in driving mode of the vehicle by operating a hazard lamp of the vehicle.

8. The vehicle behavior control device according to claim 1, wherein the changing of the vehicle behavior includes guiding a passenger of the vehicle on a safe posture with respect to a change in driving mode of the vehicle.

9. A vehicle behavior control method comprising:

detecting a cyber-attack on a vehicle;

acquiring situation information including at least one of information about a situation of the vehicle or information about a situation around the vehicle;

determining, based on the situation information, a safety level related to a countermeasure against the cyber-attack; and changing a vehicle behavior of the vehicle related to the countermeasure against the cyber-attack in accordance with the safety level wherein the changing of the vehicle behavior includes interrupting automatic driving during remote parking, the interrupting being performed after moving the vehicle to a position where a driver of the vehicle is allowed to get on the vehicle from a time point at which the cyber-attack is detected, the moving of the vehicle being performed based on a distance to an obstacle detected around the vehicle during the remote parking.

10. The vehicle behavior control method according to claim 9, wherein the information about the situation of the vehicle includes at least one of a vehicle speed, a steering angle, a driving mode, or a security severity level of the vehicle.

11. The vehicle behavior control method according to claim 9, wherein the information about the situation around the vehicle includes at least one of information about a driving place of the vehicle or information about obstacle around the vehicle, the information about obstacle indicating at least one of presence or absence of the obstacle around the vehicle or a position of the obstacle.

12. The vehicle behavior control method according to claim 9, wherein the changing of the vehicle behavior includes changing, when automatic driving is being performed, a control timing of handover from the automatic driving to manual driving in accordance with the safety level.

13. The vehicle behavior control method according to claim 9, wherein the changing of the vehicle behavior includes changing, when manual driving is being performed, a notification timing of making notification about the cyber-attack to a driver of the vehicle in accordance with the safety level.

14. The vehicle behavior control method according to claim 9, wherein the changing of the vehicle behavior includes changing between sound output and screen display for notification about the cyber-attack to a driver of the vehicle when manual driving is being performed.

15. The vehicle behavior control method according to claim 9, wherein the changing of the vehicle behavior includes notifying surroundings of a change in driving mode of the vehicle by operating a hazard lamp of the vehicle.

16. The vehicle behavior control method according to claim 9, wherein the changing of the vehicle behavior includes guiding a passenger of the vehicle on a safe posture with respect to a change in driving mode of the vehicle.

* * * * *